(12) United States Patent
Jang et al.

(10) Patent No.: US 11,005,564 B2
(45) Date of Patent: May 11, 2021

(54) COMMUNICATION METHOD AND APPARATUS USING HYBRID MODULATION SCHEME IN COMMUNICATION SYSTEM

(71) Applicant: KOOKMIN UNIVERSITY INDUSTRY ACADEMY COOPERATION FOUNDATION, Seoul (KR)

(72) Inventors: Yeong Min Jang, Seoul (KR); Thieu Minh Duc, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/697,285

(22) Filed: Nov. 27, 2019

(65) Prior Publication Data
US 2020/0235813 A1 Jul. 23, 2020

(30) Foreign Application Priority Data

Jan. 17, 2019 (KR) .................. 10-2019-0006357
Apr. 19, 2019 (KR) .................. 10-2019-0046218

(51) Int. Cl.
*H04B 10/516* (2013.01)
*H04B 10/116* (2013.01)
(Continued)

(52) U.S. Cl.
CPC ....... *H04B 10/116* (2013.01); *H04B 10/1143* (2013.01); *H04B 10/502* (2013.01);
(Continued)

(58) Field of Classification Search
CPC ............. H04B 10/11–118; H04B 10/502
(Continued)

(56) References Cited

U.S. PATENT DOCUMENTS 9,384,495 B1 * 7/2016 Cope .................. H04B 10/114
9,854,362 B1 * 12/2017 Milne .................. H04S 3/008
(Continued)

FOREIGN PATENT DOCUMENTS

KR      1020160137846 A    12/2016
KR      10-2017-0085952 A   7/2017
(Continued)

OTHER PUBLICATIONS

Nguyen et al: "Current Status and Performance Analysis of Optical Camera Communication Technologies for 5G Networks", IEEEAccess, vol. 5, 2017, Mar. 30, 2017, pp. 4574-4594 (Year: 2017).*
(Continued)

*Primary Examiner* — Li Liu
(74) *Attorney, Agent, or Firm* — Knobbe Martens Olson & Bear LLP

(57) ABSTRACT

Provided are a communication method and apparatus using a hybrid modulation scheme in a communication system. The communication node uses a hybrid modulation scheme in the communication system and includes a processor, a first light-emitting diode (LED) array configured to transmit a first signal by blinking a first LED set according to control of the processor, a second LED array configured to transmit a second signal by blinking a second LED set according to control of the processor, and a memory configured to store one or more instructions executed by the processor. Therefore, performance of the communication system can be improved.

11 Claims, 12 Drawing Sheets

(51) Int. Cl.
*H04B 10/114* (2013.01)
*H04B 10/67* (2013.01)
*H04B 10/556* (2013.01)
*H04B 10/50* (2013.01)
*H04B 10/54* (2013.01)

(52) U.S. Cl.
CPC ......... *H04B 10/5161* (2013.01); *H04B 10/54* (2013.01); *H04B 10/556* (2013.01); *H04B 10/677* (2013.01)

(58) Field of Classification Search
USPC .................................................. 398/118–131
See application file for complete search history.

(56) References Cited

U.S. PATENT DOCUMENTS

| | | | | |
|---|---|---|---|---|
| 10,075,791 | B2* | 9/2018 | Milne | H04R 29/002 |
| 10,277,317 | B2* | 4/2019 | Darabi | H04B 10/116 |
| 10,313,010 | B2* | 6/2019 | Everett | H04B 10/1123 |
| 2011/0271168 | A1 | 11/2011 | Han et al. | |
| 2017/0187455 | A1* | 6/2017 | Roberts | H04B 10/524 |
| 2018/0159624 | A1* | 6/2018 | Jang | H04N 5/3532 |
| 2018/0210235 | A1* | 7/2018 | Boss | H04B 10/116 |
| 2018/0292513 | A1* | 10/2018 | Bidner | G01S 7/4808 |
| 2019/0326997 | A1* | 10/2019 | Jang | H04B 10/502 |
| 2019/0356385 | A1* | 11/2019 | Jang | H04B 10/676 |
| 2020/0076504 | A1* | 3/2020 | Inskeep | H04L 1/0061 |

FOREIGN PATENT DOCUMENTS

| | | | | |
|---|---|---|---|---|
| KR | 20170085952 | * | 7/2017 | ............ H05B 37/02 |
| KR | 10-2018-0100212 A | | 9/2018 | |
| WO | WO2017122925 A2 | | 7/2017 | |
| WO | WO-2017122925 A3 | * | 3/2018 | ......... H04B 10/5561 |

OTHER PUBLICATIONS

Jang et al: "Kookmin PHY 4 modes—hybrid modulation schemes and cameras ISC modes", IEEE P802.15-16-0239-00-007a, Mar. 2016, pp. 1-13 (Year: 2016).*

* cited by examiner

□ : REFERENCE LED GROUP  □ : DATA LED GROUP  ○ : LED

FIG. 15
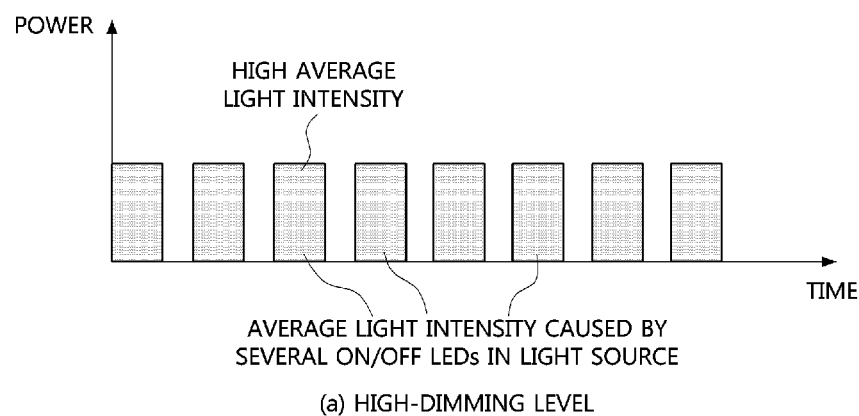
(a) HIGH-DIMMING LEVEL
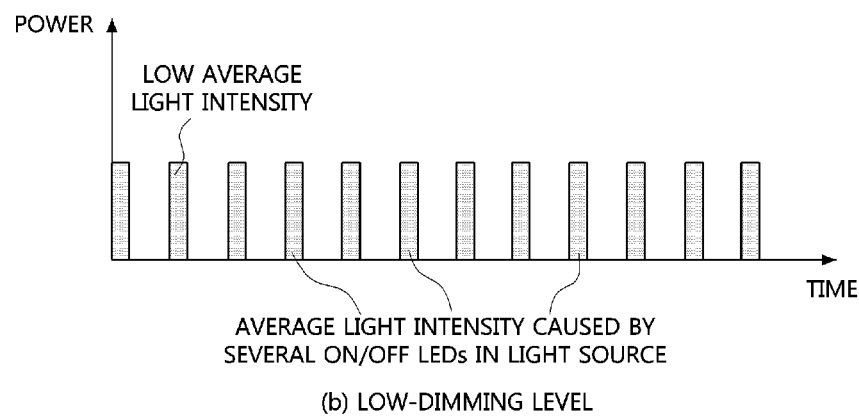
(b) LOW-DIMMING LEVEL

COMMUNICATION METHOD AND APPARATUS USING HYBRID MODULATION SCHEME IN COMMUNICATION SYSTEM

CLAIM FOR PRIORITY

This application claims priorities to Korean Patent Application No. 10-2019-0006357 filed on Jan. 17, 2019 and No. 10-2019-0046218 field on Apr. 19, 2019 in the Korean Intellectual Property Office (KIPO), the entire contents of which are hereby incorporated by reference.

BACKGROUND

1. Technical Field

Example embodiments of the present invention relate in general to a communication technology employing an optical camera and more specifically to a communication method and apparatus using a hybrid modulation scheme in a communication system.

2. Related Art

With the development of information and communications technology, various wireless communication technologies are under development. Visible light communication (VLC) may be performed using a light-emitting diode (LED). VLC technology was standardized in Institute of Electrical and Electronics Engineers (IEEE) 802.15.7, which defines techniques of a physical (PHY) layer and a medium access control (MAC) layer. In particular, IEEE 802.15.7 defines techniques for high-speed data transmission and reception in a line of sight (LoS) environment, but it is difficult to apply the techniques to an actual communication environment.

Due to the need for improvement in IEEE 802.15.7, IEEE 802.15.7m was standardized. IEEE 802.15.7m defines optical wireless communication (OWC) technology, which may include light fidelity (LiFi) technology, optical camera communication (OCC) technology, LED identification (LED-ID) technology, and the like.

In a communication system which supports OCC (hereinafter, referred to as "OCC system"), a transmitter may perform communication using one modulation scheme (e.g., on-off keying (OOK) or phase shift keying (PSK)). When different modulation schemes are used according to types of signals (e.g., control information or user data), transmission requirements (e.g., delay and reliability) corresponding to a type of signal may be satisfied. In a current OCC system, however, signals can be transmitted and received according to only one modulation scheme. Therefore, it is necessary to develop a communication device and method for solving this problem.

SUMMARY

Accordingly, example embodiments of the present invention are provided to substantially obviate one or more problems due to limitations and disadvantages of the related art.

Example embodiments of the present invention provide a device and method for transmitting and receiving signals using a hybrid modulation scheme in a communication system.

According to embodiments of the present disclosure, a first communication node comprises a processor, a first light-emitting diode (LED) array configured to transmit a first signal by blinking a first LED set according to control of the processor, a second LED array configured to transmit a second signal by blinking a second LED set according to control of the processor, and a memory configured to store one or more instructions executed by the processor, wherein the one or more instructions are executed to modulate control information using camera on-off keying (C-OOK), transmit the first signal including the modulated control information to a second communication node by blinking the first LED set included in the first LED array on the basis of the modulated control information, modulate user data using dimmable spatial 8-phase shift keying (DS8-PSK), and transmit the second signal including the modulated user data to the second communication node by blinking the second LED set included in the second LED array on the basis of the modulated user data, wherein each of the first LED set and the second LED set includes one or more LEDs, and the control information includes information elements required for transmitting the second signal.

The control information may include an identifier (ID) of the first communication node, an ID of the second communication node, and information indicating that a hybrid modulation scheme is supported.

The control information may include information indicating a number of LED groups included in the second LED array, information indicating a number of LEDs included in each of the LED groups, and information indicating an LED arrangement in each of the LED groups.

The control information may include information on a first table indicating mapping relationships between global phase shift values and bit streams, information on a second table indicating mapping relationships between bit streams and local phase shift values according to dimming levels, and information on a pattern of dimming levels.

The pattern of dimming levels may be applied in units of packets or sub-packets, the packets may include a plurality of sub-packets, and a plurality of sub-packets included in the same packet may include identical user data.

The second signal may include a reference signal transmitted through a reference LED group included in the second LED array and a data signal transmitted through a data LED group included in the second LED array, the reference signal may have a first local phase shift value, the data signal may have a second local phase shift value, and a difference between the first local phase shift value and the second local phase shift value may be a global phase shift value.

The second signal may be transmitted when a response signal to the first signal is received from the second communication node, and the response signal may include information indicating that the second communication node supports a hybrid modulation scheme.

According to embodiments of the present disclosure, a first communication node comprises a processor, a first camera configured to photograph a first blink state of a first light-emitting diode (LED) array included in a second communication node according to control of the processor, a second camera configured to photograph a second blink state of a second LED array included in the second communication node according to control of the processor, and a memory configured to store one or more instructions executed by the processor, wherein the one or more instructions are executed to acquire control information from the first blink state using camera on-off keying (C-OOK), and acquire user data from the second blink state using dimmable spatial 8-phase shift keying (DS8-PSK), wherein the control information includes information elements required for receiving the user data, and the user data is acquired on the basis of the control information.

The control information may include an identifier (ID) of the first communication node, an ID of the second communication node, information indicating that a hybrid modulation scheme is supported, information indicating a number of LED groups included in the second LED array, information indicating a number of LEDs included in each of the LED groups, and information indicating an LED arrangement in each of the LED groups.

The control information may include information on a first table indicating mapping relationships between global phase shift values and bit streams, information on a second table indicating mapping relationships between bit streams and local phase shift values according to dimming levels, and information on a pattern of dimming levels.

The pattern of dimming levels may be applied in units of packets or sub-packets, the packets may include a plurality of sub-packets, and a plurality of sub-packets included in the same packet may include identical user data.

The user data may be acquired on the basis of a reference signal received through a reference LED group included in the second LED array and a data signal received through a data LED group included in the second LED array, the reference signal may have a first local phase shift value, the data signal may have a second local phase shift value, and a difference between the first local phase shift value and the second local phase shift value may be a global phase shift value.

BRIEF DESCRIPTION OF DRAWINGS

Example embodiments of the present invention will become more apparent by describing in detail example embodiments of the present invention with reference to the accompanying drawings, in which:

FIG. 15 is a timing diagram illustrating a second signal generated by a second modulation scheme in a communication system.

DESCRIPTION OF EXAMPLE EMBODIMENTS

Figure 1:
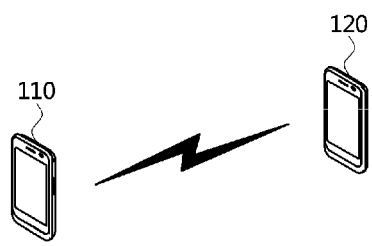
FIG. 1 is a conceptual view showing a first example embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, a communication system to which embodiments according to the present disclosure will be described. However, the communication systems to which the embodiments according to the present disclosure are applied are not restricted to what will be described below. That is, the embodiments according to the present disclosure may be applied to various communication systems. Here, the communication system may be used in the same meaning as a communication network.

FIG. 1 is a conceptual view showing a first example embodiment of a communication system.

Referring to FIG. 1, a communication system may include a plurality of communication nodes 110 and 120. The plurality of communication nodes 110 and 120 may perform communication using communication schemes defined in Institute of Electrical and Electronics Engineers (IEEE) 802.15.7 (e.g., IEEE 802.15.7 m). For example, each of the plurality of communication nodes 110 and 120 may include light-emitting diodes (LEDs) and a camera, transmit a signal by blinking the LEDs, and acquire a signal on the basis of blink states of LEDs photographed by the camera. Each of the plurality of communication nodes 110 and 120 may be a sensor node, an Internet of Things (IoT) node, a smart phone, or the like. Each of the plurality of communication nodes 110 and 120 may have the following structure.

Figure 2:
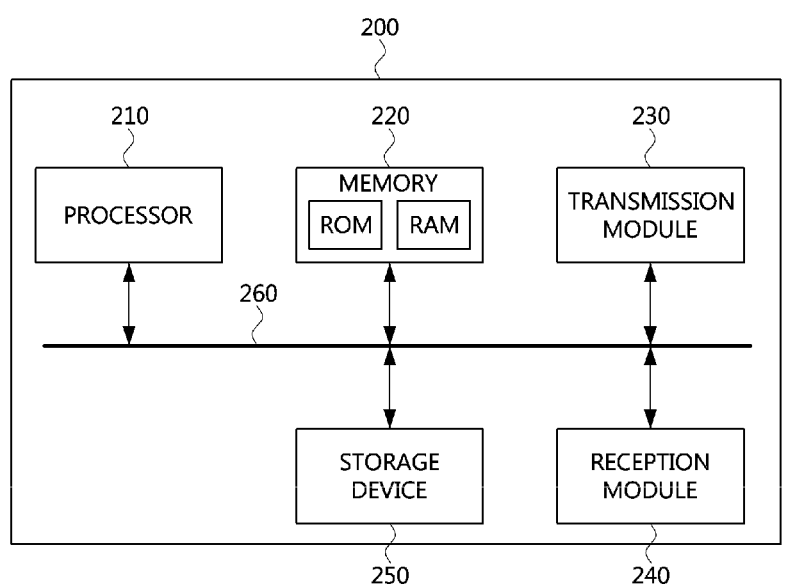
FIG. 2 is a block diagram showing a first example embodiment of a communication node constituting a communication system.

FIG. 2 is a block diagram showing a first example embodiment of a communication node constituting a communication system.

Referring to FIG. 2, a communication node 200 may include a processor 210, a memory 220, a transmission module 230, and a reception module 240. Also, the communication node 200 may further include a storage device 250 and the like. The respective components included in the communication node 200 may be connected through a bus 260 and communicate with each other.

However, the respective components included in the communication node 200 may be connected through an individual interface or an individual bus rather than the common bus 260 centering on the processor 210. For example, the processor 210 may be connected to at least one of the memory 220, the transmission module 230, the reception module 240, and the storage device 250 through a dedicated interface.

The processor 210 may execute a program command stored in at least one of the memory 220 and the storage device 250. The processor 210 may be a central processing unit (CPU), a graphics processing unit (GPU), or a dedicated processor by which methods according to example embodiments of the present invention are performed. Each of the memory 220 and the storage device 250 may be composed of at least one of a volatile storage medium and a non-volatile storage medium. For example, the memory 220 may be composed of at least one of a read only memory (ROM) and a random access memory (RAM).

The transmission module 230 may include an LED array and operate according to control of the processor 210. The reception module 240 may include a camera and may operate according to control of the processor 210. The transmission module 230 may be configured as follows.

Figure 3:
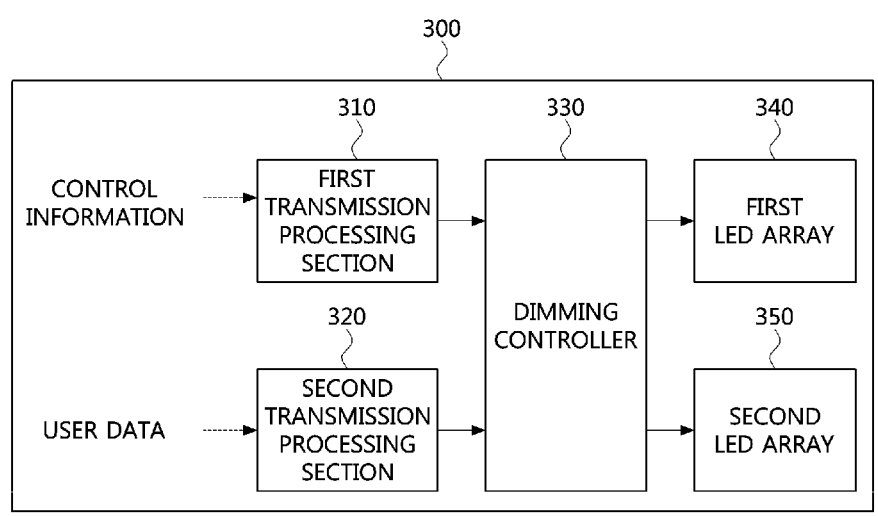
FIG. 3 is a block diagram showing a first example embodiment of a transmission module included in a communication node in a communication system.

FIG. 3 is a block diagram showing a first example embodiment of a transmission module included in a communication node in a communication system.

Referring to FIG. 3, a transmission module 300 may include a first transmission processing section 310, a second transmission processing section 320, a dimming controller 330, a first LED array 340, and a second LED array 350. The first transmission processing section 310 may process an input signal using a first modulation scheme (e.g., camera on-off keying (C-OOK)), and the second transmission processing section 320 may process an input signal using a second modulation scheme (e.g., dimmable spatial 8-phase shift keying (DS8-PSK)). A signal transmission rate of the first modulation scheme may be lower than that of the second modulation scheme.

The input signal of the first transmission processing section 310 may include control information (e.g., important information). For example, the control information may include an identifier (ID) of the communication node, transmission parameters required for transmission according to the second modulation scheme, and the like. The input signal of the second transmission processing section 320 may be user data (e.g., a data signal). The first transmission processing section 310 may be configured as follows.

Figure 4:
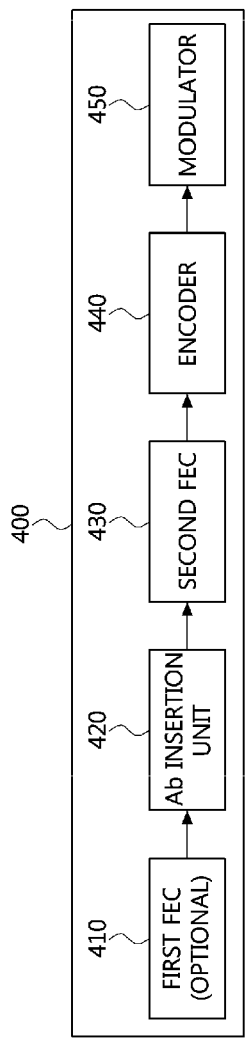
FIG. 4 is a block diagram showing a first example embodiment of a first transmission processing section included in a transmission module in a communication system.

FIG. 4 is a block diagram showing a first example embodiment of a first transmission processing section included in a transmission module in a communication system.

Referring to FIG. 4, a first transmission processing section 400 may include a first forward error correction (FEC) unit 410, an asynchronous bit (Ab) insertion unit 420, a second FEC unit 430, an encoder 440, and a modulator 450. In example embodiments of the present invention, a unit may indicate a means, an entity, an apparatus, or the like which performs a specific function. The first FEC unit 410 may not be included in the first transmission processing section 400. The first transmission processing section 400 and components corresponding thereto (e.g., the first LED array 340 shown in FIG. 3 and a first camera 910 and a first reception processing section 940 shown in FIG. 9) may operate in one of the modes shown in Table 1 below. In Table 1 below, a data symbol (DS) may be a payload included in a sub-packet.

TABLE 1

|  | Mode 1 | Mode 2 | Mode 3 | Mode 4 |
|---|---|---|---|---|
| Optical clock rate | 2.2 kHz | 2.2 kHz | 4.4 kHz | 4.4 kHz |
| Sub-packet rate | 100 DS/s | 60 DS/s | 60 DS/s | 60 DS/s |
| Run-length limited (RLL) code | Manchester | 4B6B | Manchester | 4B6B |
| Uncoded bit rate | 80 bps | 180 bps | 330 bps | 400 bps |

A bit stream may be input to the first FEC unit 410, which may add additional information for FEC to the bit stream. The first FEC unit 410 may output "bit stream+additional information." "Bit stream+additional information" may be referred to as "payload (e.g., DS)." When the first transmission processing section 400 does not include the first FEC unit 410, the payload may be composed of the bit stream without the additional information.

The Ab insertion unit 420 may insert an Ab to the front and behind of the payload. The Ab may be composed of one bit or two bits. The Ab may be used to distinguish a payload in a sub-packet or a packet. The Ab insertion unit 420 may output "Ab+payload (e.g., data bits)+Ab." The second FEC unit 430 may add additional information for FEC to a signal input from the Ab insertion unit 420. The encoder 440 may encode a signal input from the second FEC unit 430 and output the encoded signal. The modulator 450 may modulate a signal input from the encoder 440 (e.g., the encoded signal) using the first modulation scheme (e.g., C-OOK). An output signal of the modulator 450 may be input to the first LED array 340 shown in FIG. 3. The first LED array 340 may include a plurality of LEDs, which may blink according to the output signal of the modulator 450.

Meanwhile, a packet generated by the first transmission processing section 310 may be as follows.

Figure 5:
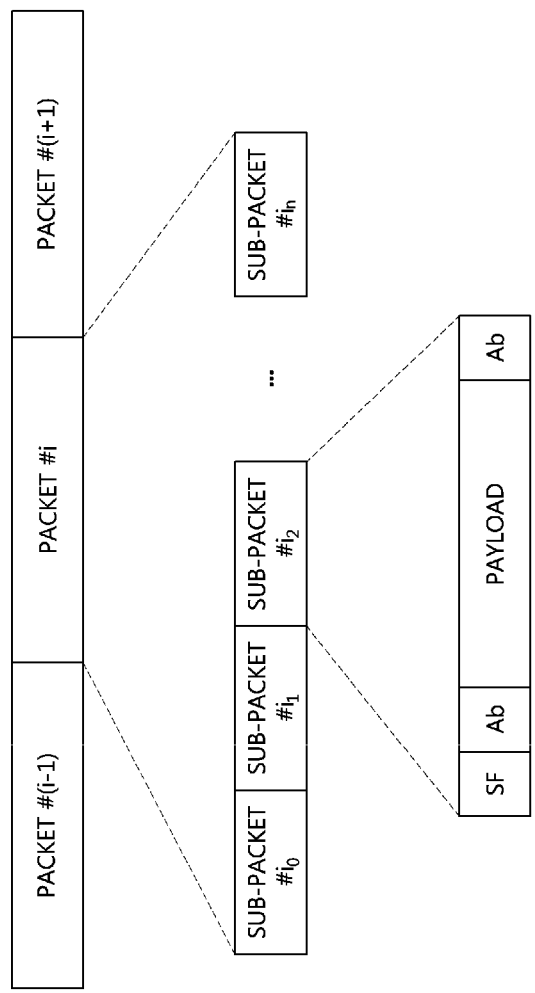
FIG. 5 is a block diagram showing a first example embodiment of a packet in a communication system.

FIG. 5 is a block diagram showing a first example embodiment of a packet in a communication system.

Referring to FIG. 5, a plurality of packets may be generated in a communication system. Payloads (e.g., DSs) each included in the plurality of packets may differ from each other. A single packet may include a plurality of sub-packets, and the plurality of sub-packets included in the single packet may include the same payload (e.g., a DS). In other words, the same payload may be repeatedly transmitted through identical packets in order to prevent omission of data transmission. Alternatively, a plurality of sub-packets included in one packet may include different payloads. In this case, the different payloads included in the single packet are consecutively connected such that one data unit may be generated.

A packet rate may be defined to be the number of packets including different payloads among packets transmitted in a specific period of time. A packet may be designed to support both over-sampling and under-sampling. Over-sampling may be a sampling method used when rolling speed of a first camera (i.e., the first camera 910 shown in FIG. 9) is higher than a packet rate. Under-sampling may be a sampling method used when rolling speed of a first camera (i.e., the first camera 910 shown in FIG. 9) is lower than a packet rate.

Sub-packets may be generated on the basis of one of the modes described in Table 2 below.

TABLE 2

|  | Mode 1 | Mode 2 | Mode 3 | Mode 4 |
|---|---|---|---|---|
| DS clock | 22 B | 37 B | 74 B | 74 B |
| Preamble | 6 B | 10 B | 6 B | 10 B |

TABLE 2-continued

|  | Mode 1 | Mode 2 | Mode 3 | Mode 4 |
|---|---|---|---|---|
| Payload (DS) (Ab, data bits, Ab) | 8 bits (16 B) | 18 bits (27 B) | 33 bits (66 B, 2 B unused) | 40 bits (60 B, 4 B unused) |
| Bit rate | 40 bps | 110 bps | 220 bps | 400 bps |

Also, one sub-packet may include a start frame (SF), an Ab, a payload, and an Ab. Each of the SF and the Abs may have a size of one bit. Alternatively, the Abs may have a size of 2 bits or more. The SF may be used to indicate a start of the sub-packet. The Abs may be used to distinguish a packet. For example, Abs included in even-numbered packets may be set to 0, and Abs included in odd-numbered packets may be set to 1. In this case, a terminal is able to determine whether a packet is an even-numbered packet or an odd-numbered packet on the basis of Abs included in the packet.

Figure 6:
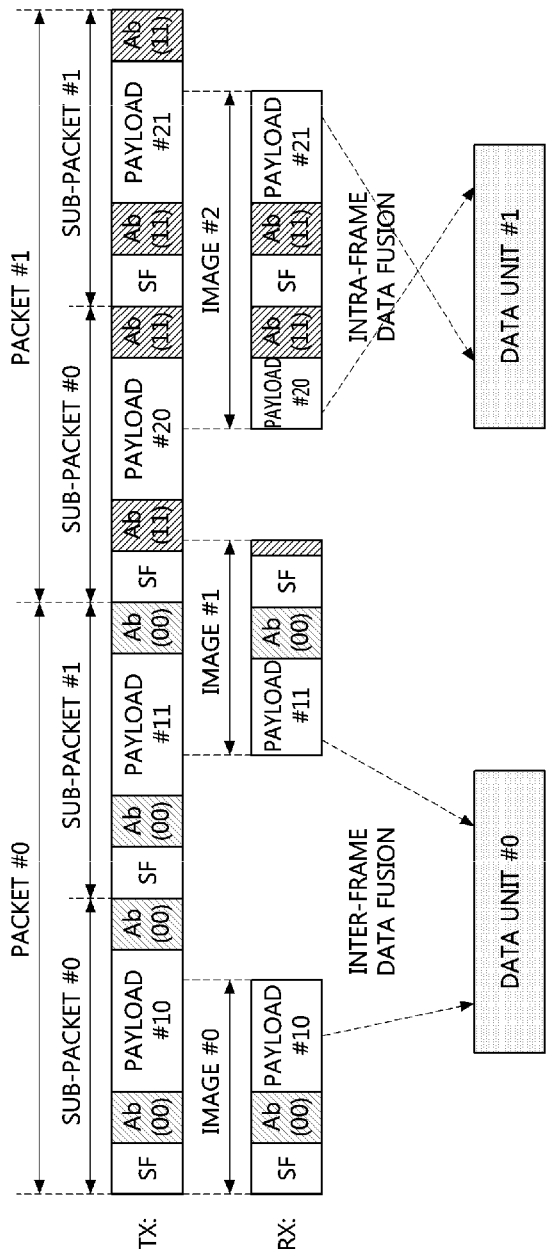
FIG. 6 is a conceptual diagram showing a first example embodiment of a decoding method in a communication system.

FIG. 6 is a conceptual diagram showing a first example embodiment of a decoding method in a communication system.

Referring to FIG. 6, when a receiving communication node is not synchronized with a transmitting communication node, an image captured (e.g., image photographed) by the receiving communication node may not include whole of one sub-packet. For example, when an image #0 captured by the receiving communication node includes part of a payload #10 and an image #1 captured by the receiving communication node includes part of a payload #11, the receiving communication node may obtain a data unit #0 by combining the part of the payload #10 (e.g., a front portion of the data unit #0) and the part of the payload #11 (e.g., a rear portion of the data unit #0).

Also, an image #2 captured by the receiving communication node may include part of a payload #20 and part of a payload #21. In this case, the receiving communication node may obtain a data unit #1 by combining the part of the payload #20 (e.g., a rear portion of the data unit #1) and the part of the payload #21 (e.g., a front portion of the data unit #1).

Meanwhile, the second transmission processing section 320 shown in FIG. 3 may be configured as follows.

Figure 7:
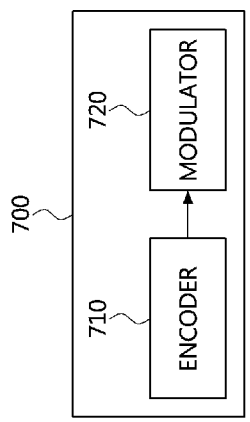
FIG. 7 is a block diagram showing a first example embodiment of a second transmission processing section included in a transmission module in a communication system.

FIG. 7 is a block diagram showing a first example embodiment of a second transmission processing section included in a transmission module in a communication system.

Referring to FIG. 7, a second transmission processing section 700 may include an encoder 710 and a modulator 720. The encoder 710 may encode an input signal (e.g., a bit stream) and output the encoded signal. The modulator 720 may modulate the signal input from the encoder 710 using the second modulation scheme (e.g., DS8-PSK). The second transmission processing section 700 and components corresponding thereto (e.g., the second LED array 350 shown in FIG. 3 and a second camera 920 and a second reception processing section 950 shown in FIG. 9) may operate in one of the modes shown in Table 3 below.

TABLE 3

|  | Mode 1 | Mode 2 |
|---|---|---|
| Optical clock rate | 80 kHz | 400 kHz |
| Required minimum camera frame rate | 20 kfps | 100 kfps |

An output signal of the modulator 720 may be input to the dimming controller 330 shown in FIG. 3. The dimming controller 330 may operate according to preset dimming levels (e.g., 1/8, 2/8, 3/8, 4/8, 5/8, 6/8, and 7/8). The second LED array 350 shown in FIG. 3 may blink according to the output signal of the modulator 720 and control of the dimming controller 330. Here, the second LED array 350 may be configured as follows.

Figure 8:
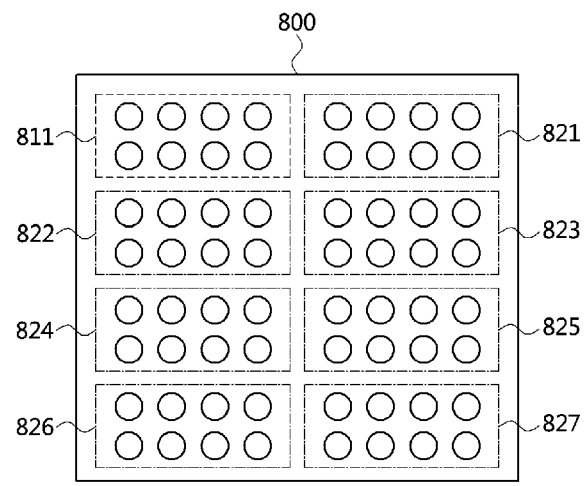
FIG. 8 is a conceptual diagram showing a first example embodiment of a second light-emitting diode (LED) array included in a communication node in a communication system.

FIG. 8 is a conceptual diagram showing a first example embodiment of a second LED array included in a communication node in a communication system.

Referring to FIG. 8, a second LED array 800 may include a plurality of LED groups, which may be classified into a reference LED group 811 and data LED groups 821, 822, 823, 824, 825, 826, and 827. In other words, the second LED array 800 may include the single reference LED group 811 and the plurality of data LED groups 821, 822, 823, 824, 825, 826, and 827. Each of the plurality of LED groups 811, 821, 822, 823, 824, 825, 826, and 827 may include K LEDs. K may be a natural number. For example, K may be 8. In the LED groups, LEDs may be arranged in A×B form. A may indicate the number of rows in the LED groups, and B may indicate the number of columns in the LED groups. For example, in the LED groups, LEDs may be arranged in the form of 1×8, 2×4, 4×2, or 8×1.

Meanwhile, the reception module 240 included in the communication node 200 shown in FIG. 2 may be configured as follows.

Figure 9:
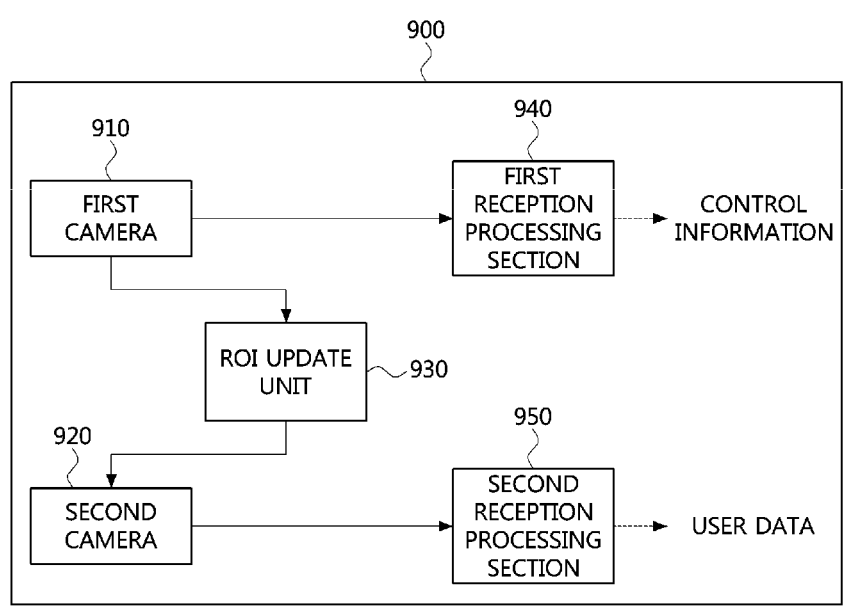
FIG. 9 is a block diagram showing a first example embodiment of a reception module included in a communication node in a communication system.

FIG. 9 is a block diagram showing a first example embodiment of a reception module included in a communication node in a communication system.

Referring to FIG. 9, a reception module 900 may include the first camera 910, the second camera 920, a region of interest (RoI) update unit 930, the first reception processing section 940, and the second reception processing section 950. The first camera 910 may be used to capture images having a relatively low frame rate and may capture images generated by the first LED array 340 included in the transmission module 300 shown in FIG. 3. In other words, the first camera 910 may be used to receive a low-speed data stream and sense an RoI. The RoI may be a location of an intended light source (e.g., LED array, LED group, or LED) for the communication. The first camera 910 may have a shutter speed of 8 kHz or less.

The RoI update unit 930 may sense an RoI on the basis of images captured by the first camera 910 and activate the second camera 920 on the basis of the result. RoI information detected by the RoI update unit 930 may be transmitted to the second camera 920, and the second camera 920 may be activated to capture the RoI (e.g., intended light source). When the second camera 920 is activated, a communication link between the first communication node 110 and the second communication node 120 shown in FIG. 1 may be activated. The second camera 920 may be used to capture images having a relatively high frame rate and may capture images generated by the second LED array 350 (i.e., the second LED array 800 shown in FIG. 8) included in the transmission module 300 shown in FIG. 3. In other words, the second camera 920 may be used to receive a high-speed data stream through the RoI (e.g., intended light source) selected by the RoI update unit 930.

The first reception processing section 940 may acquire control information from the images captured by the first camera 910. In this case, the first reception processing section 940 may acquire control information according to a demodulation scheme corresponding to the first modulation scheme (e.g., C-OOK). The second reception processing section 950 may acquire user data from the images captured by the second camera 920. In this case, the second reception processing section 950 may acquire the user data according to a demodulation scheme corresponding to the second modulation scheme (e.g., DS8-PSK).

Meanwhile, the first reception processing section 940 may be configured as follows.

Figure 10:
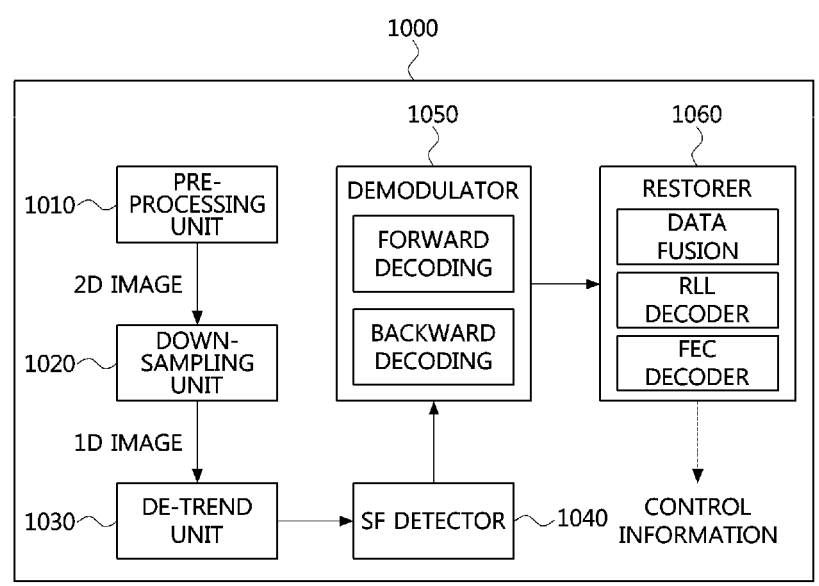
FIG. 10 is a block diagram showing a first example embodiment of a first reception processing section included in a reception module in a communication system.

FIG. 10 is a block diagram showing a first example embodiment of a first reception processing section included in a reception module in a communication system.

Referring to FIG. 10, a first reception processing section 1000 may include a pre-processing unit 1010, a down-sampling unit 1020, a de-trend unit 1030, an SF detector 1040, a demodulator 1050, and a restorer 1060. The pre-processing unit 1010 may acquire a captured image from the first camera 910 shown in FIG. 9 and acquire a two-dimensional (2D) image by pre-processing the captured image. The 2D image may be input to the down-sampling unit 1020. The down-sampling unit 1020 may generate a one-dimensional (1D) image by down-sampling the 2D image. The 1D image may be input to the de-trend unit 1030.

The de-trend unit 1030 may remove a specific signal by de-trending the input signal (e.g., the 1D image). The SF detector 1040 may detect a start time point of a sub-packet by detecting an SF (i.e., an SF shown in FIG. 5) in a signal input from the de-trend unit 1030. The SF detector 1040 may transfer "Ab+ payload+ Ab" which is the sub-packet except for the SF to the demodulator 1050. The demodulator 1050 may receive "Ab+payload+Ab" from the SF detector 1040 and distinguish a packet to which the sub-packet belongs on the basis of the Abs. Also, the demodulator 1050 may detect a decoding direction (e.g., forward decoding or backward decoding) on the basis of the Abs and decode the payload on the basis of the detected decoding direction. A decoded signal which is an output of the demodulator 1050 may be transferred to the restorer 1060. The restorer 1060 may acquire final data (i.e., control information) by performing a data fusion operation, an operation according to a RLL decoder, an operation according to a FEC decoder and the like.

Next, methods of transmitting and receiving data in a communication system will be described. While a method (e.g., signal transmission or reception) performed by a first communication node among communication nodes is described, a second communication node corresponding to the first communication node may perform a method (e.g., signal reception or transmission) corresponding to the method performed by the first communication node. In other words, when an operation of a terminal is described, a base station corresponding to the terminal may perform an operation corresponding to the operation of the terminal. On the other hand, when an operation of a base station is described, a terminal corresponding to the base station may perform an operation corresponding to the operation of the base station.

Figure 11:
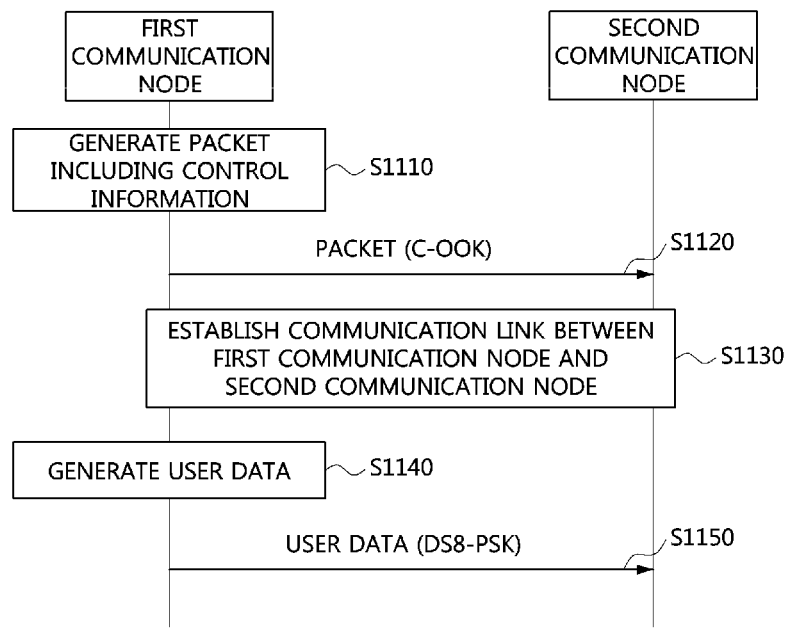
FIG. 11 is a sequence diagram illustrating a first example embodiment of a method of transmitting and receiving data in a communication system.

FIG. 11 is a sequence diagram illustrating a first example embodiment of a method of transmitting and receiving data in a communication system.

Referring to FIG. 11, a communication system may include a first communication node and a second communication node. The first communication node may be the first communication node 110 shown in FIG. 1, and the second communication node may be the second communication node 120 shown in FIG. 2. Each of the first communication node and the second communication node may be configured equal or similar to the communication node 200 shown in FIG. 2. A transmission module included in each of the first communication node and the second communication node may be configured equal or similar to the example embodiments shown in FIGS. 3, 4, and 7. A reception module included in each of the first communication node and the second communication node may be configured equal or similar to the example embodiments shown in FIGS. 9 and 10.

In a communication link establishment procedure, the first communication node may generate a packet including control information (S1110). The packet including the control information may be generated by a first transmission processing section included in the first communication node and configured equal or similar to the packet shown in FIG. 5. The control information may include at least one or more of information elements described in Table 4 below.

TABLE 4

| Information element | Content |
| --- | --- |
| ID | IDs of communication nodes (i.e., transmission and reception communication nodes) |
| Hybrid modulation indicator | 0: Not support hybrid modulation<br>1: Support hybrid modulation |
| Modulation scheme | C-OOK and DS8-PSK |
| Phase mapping table | A table indicating mapping relationships between global phase shift values and bit streams |
| Dimming mapping table | A table indicating mapping relationships between bit streams and local phase shift values according to dimming levels |
| Dimming pattern | A pattern of dimming levels used when LEDs blink in a transmission communication node |
| Number of Data LED groups | The number of data LED groups among LED groups included in a communication node |
| Number of LEDs belonging to LED group | The number K of LEDs included in each of LED groups of a communication node |
| LED arrangement in LED group | 0: 1 × 8<br>1: 2 × 4<br>2: 4 × 2<br>3: 8 × 1 |

The ID may indicate an ID of the first communication node. In addition to the ID of the first communication node, the ID may indicate an ID of the second communication node which receives the packet including the control information. The hybrid modulation indicator may be set to 1. The phase mapping table may be set up as shown in Table 5 below.

TABLE 5

| Bit stream | Global phase shift value |
| --- | --- |
| 000 | 0 |
| 001 | 1 |

TABLE 5-continued

| Bit stream | Global phase shift value |
| --- | --- |
| 010 | 2 |
| 011 | 3 |
| 100 | 4 |
| 101 | 5 |
| 110 | 6 |
| 111 | 7 |

A global or local phase shift value set to 1 may indicate that a phase is shifted by 45°, a global or local phase shift value set to 2 may indicate that a phase is shifted by 90°, and a global or local phase shift value set to 3 may indicate that a phase is shifted by 135°. A global or local phase shift value set to 4 may indicate that a phase is shifted by 180°, a global or local phase shift value set to 5 may indicate that a phase is shifted by 225°, a global or local phase shift value set to 6 may indicate that a phase is shifted by 270°, and a global or local phase shift value set to 7 may indicate that a phase is shifted by 315°.

In table 5, a bit stream may be an output value of a second transmission processing section included in the first communication node. For example, when an output value of the second transmission processing section is "010," a global phase shift value corresponding thereto may be 2. Also, the phase mapping table shown as Table 5 may be used to acquire a bit stream corresponding to a global phase shift value in the second communication node.

In Table 4, the dimming mapping table may be set up as shown in FIGS. 6 to 12 below. Dimming levels may be classified into 7 kinds. For example, dimming levels may be classified as dimming ⅛, dimming ⅖, dimming ⅜, dimming ⅘, dimming ⅝, dimming ⅚, and dimming ⅞. Dimming ⅜ may indicate that 3 of 8 LEDs included in an LED group are in ON state at a specific point in time. In other words, when a dimming value is "1110 0000," the first, second, and third LEDs included in the LED group may be in ON state, and the other five LEDS may be in OFF state.

TABLE 6

| Dimming 1/8 | Local phase shift value |
| --- | --- |
| 1000 0000 | 0 |
| 0100 0000 | 1 |
| 0010 0000 | 2 |
| 0001 0000 | 3 |
| 0000 1000 | 4 |
| 0000 0100 | 5 |
| 0000 0010 | 6 |
| 0000 0001 | 7 |

TABLE 7

| Dimming 2/8 | Local phase shift value |
| --- | --- |
| 1000 0001 | 0 |
| 1100 0000 | 1 |
| 0110 0000 | 2 |
| 0011 0000 | 3 |
| 0001 1000 | 4 |
| 0000 1100 | 5 |
| 0000 0110 | 6 |
| 0000 0011 | 7 |

TABLE 8

| Dimming 3/8 | Local phase shift value |
|---|---|
| 1000 0011 | 0 |
| 1100 0001 | 1 |
| 1110 0000 | 2 |
| 0111 0000 | 3 |
| 0011 1000 | 4 |
| 0001 1100 | 5 |
| 0000 1110 | 6 |
| 0000 0111 | 7 |

TABLE 9

| Dimming 4/8 | Local phase shift value |
|---|---|
| 1000 0111 | 0 |
| 1100 0011 | 1 |
| 1110 0001 | 2 |
| 1111 0000 | 3 |
| 0111 1000 | 4 |
| 0011 1100 | 5 |
| 0001 1110 | 6 |
| 0000 1111 | 7 |

TABLE 10

| Dimming 5/8 | Local phase shift value |
|---|---|
| 1000 1111 | 0 |
| 1100 0111 | 1 |
| 1110 0011 | 2 |
| 1111 0001 | 3 |
| 1111 1000 | 4 |
| 0111 1100 | 5 |
| 0011 1110 | 6 |
| 0001 1111 | 7 |

TABLE 11

| Dimming 6/8 | Local phase shift value |
|---|---|
| 1001 1111 | 0 |
| 1100 1111 | 1 |
| 1110 0111 | 2 |
| 1111 0011 | 3 |
| 1111 1001 | 4 |
| 1111 1100 | 5 |
| 0111 1110 | 6 |
| 0011 1111 | 7 |

TABLE 12

| Dimming 7/8 | Local phase shift value |
|---|---|
| 1011 1111 | 0 |
| 1101 1111 | 1 |
| 1110 1111 | 2 |
| 1111 0111 | 3 |
| 1111 1011 | 4 |
| 1111 1101 | 5 |
| 1111 1110 | 6 |
| 0111 1111 | 7 |

The first communication node may transmit a packet including control information (a packet including one or more information elements described in Table 4) (S1120). In this case, a first LED array (e.g., the first LED array 340 shown in FIG. 3) included in the first communication node may blink such that the packet including the control information may be transmitted.

Meanwhile, the second communication node may capture images (i.e., blink states of the first LED array of the first communication node) using a first camera (e.g., the first camera 910 shown in FIG. 9) and acquire information or data from the captured images. For example, the second communication node may acquire control information from the captured images on the basis of the example embodiment shown in FIG. 10. The control information acquired by the second communication node may be the control information included in the packet transmitted from the first communication node and may include one or more information elements described in Table 4.

The second communication node may determine whether to perform communication according to a hybrid modulation scheme on the basis of the control information. When it is determined to perform communication according to a hybrid modulation scheme, a communication link may be established between the second communication node and the first communication node (S1130). In other words, when the second communication node is able to support communication based on the control information received from the first communication node, a communication link may be established between the second communication node and the first communication node. In this case, the second communication node may transmit a response packet including information indicating that it is possible to support communication according to a hybrid modulation scheme to the first communication node. The response packet may include the ID of the second communication node. Additionally, the response packet may include capability information (e.g., the information elements described in Table 4) of the second communication node.

The response packet may be transmitted by a first transmission processing section or second transmission processing section included in the second communication node. In other words, the response packet may be transmitted using C-OOK or DS8-PSK. Also, the second communication node may perform a preparatory operation to photograph blink states of a second LED array of the first communication node.

When the response packet including the information indicating that it is possible to support communication according to a hybrid modulation scheme (e.g., a response packet including information indicating that it is possible to support communication according to the control information transmitted from the first communication node) is received from the second communication node, the first communication node may determine that a communication link has been established between the first communication node and the second communication node. Alternatively, a procedure for transmitting and receiving the response packet may be omitted.

When the communication link between the first communication node and the second communication node has been established, the first communication node may generate user data (S1140). The user data may be generated by the second transmission processing section of the first communication node (e.g., the second transmission processing section 320 shown in FIG. 3).

For example, the first communication node may determine a global phase shift value which is mapped to a bit stream constituting the user data. The global phase shift value mapped to the bit stream may be determined on the basis of Table 5. When a bit stream is "010 100 110," a global phase shift value mapped to the bit stream may be determined to be "2 4 6."

After the global phase shift value mapped to the bit stream is determined, the first communication node may determine an output (e.g., an output of the dimming controller 330 shown in FIG. 3) on the basis of the global phase shift value and a dimming level (⅛, 2/8, ⅜, 4/8, ⅝, 6/8, or ⅞). The global phase shift value may be a difference between a local phase shift value of a bit stream transmitted by the reference LED group 811 shown in FIG. 8 and a local phase shift value of a bit stream transmitted by one of the data LED groups 821 to 827 shown in FIG. 8. In other words, a phase of a signal output by the data LED group may be shifted on the basis of a phase of a signal output by the reference LED group.

For example, when a dimming level is ⅜ and a global phase shift value is 2, three LEDs among the eight LEDs included in the reference LED group 811 of the first communication node may operate in ON state, three LEDs among the eight LEDs included in a single data LED group of the first communication node may operate in ON state, and a difference between a local phase shift value of a bit stream transmitted by the reference LED group 811 of the first communication node and a local phase shift value of a bit stream transmitted by the single data LED group of the first communication node may be 2.

Meanwhile, a dimming pattern used in the first communication node may be set in advance and shared between the first communication node and the second communication node. For example, the dimming pattern may be set up as "⅜→⅛→2/8→4/8." In this case, user data (e.g., a payload) belonging to packet #n may be transmitted on the basis of dimming 3/8, user data belonging to packet #n+1 may be transmitted on the basis of dimming 1/8, user data belonging to packet #n+2 may be transmitted on the basis of dimming 2/8, and user data belonging to packet #n+3 may be transmitted on the basis of dimming 4/8. Here, n may be an integer equal to or greater than 0, and dimming patterns may be set up according to packets.

Alternatively, dimming patterns may be set up according to sub-packets. In this case, when a dimming pattern is set up as "⅜→⅛→2/8→4/8," user data (e.g., a payload) belonging to sub-packet #n in a packet may be transmitted on the basis of dimming ⅜, user data belonging to sub-packet #n+1 in the packet may be transmitted on the basis of dimming ⅛, user data belonging to sub-packet #n+2 in the packet may be transmitted on the basis of dimming 2/8, and user data belonging to sub-packet #n+3 in the packet may be transmitted on the basis of dimming 4/8.

Alternatively, the dimming patterns may be set up according to each bits of C-OOK not changing according to the packet or the sub-packet. In this case, only 2 dimming levels (e.g., ⅛ and ⅞ dimming levels) may be used for the hybrid waveform. For example, all LEDs may operate in ⅛ dimming level when a bit 0 of C-OOK is transmitted. The all LEDs may operate in ⅞ dimming level when a bit 1 of C-OOK is transmitted.

The first communication node may transmit the user data by blinking LEDs belonging to the second LED array (i.e., the reference LED group and the data LED groups) on the basis of the above-described methods (S1150).

Meanwhile, a second camera of the second communication node (i.e., the second camera 920 shown in FIG. 9) may photograph blink states of the second LED array of the first communication node at a specific sampling time point and acquire information (i.e., user data) on the basis of the photographed blink states (i.e., captured images). A decoding operation performed by the second communication node may be as follows. The decoding operation may be performed on the basis of the control information included in the packet acquired in operation S1120.

Figure 12:
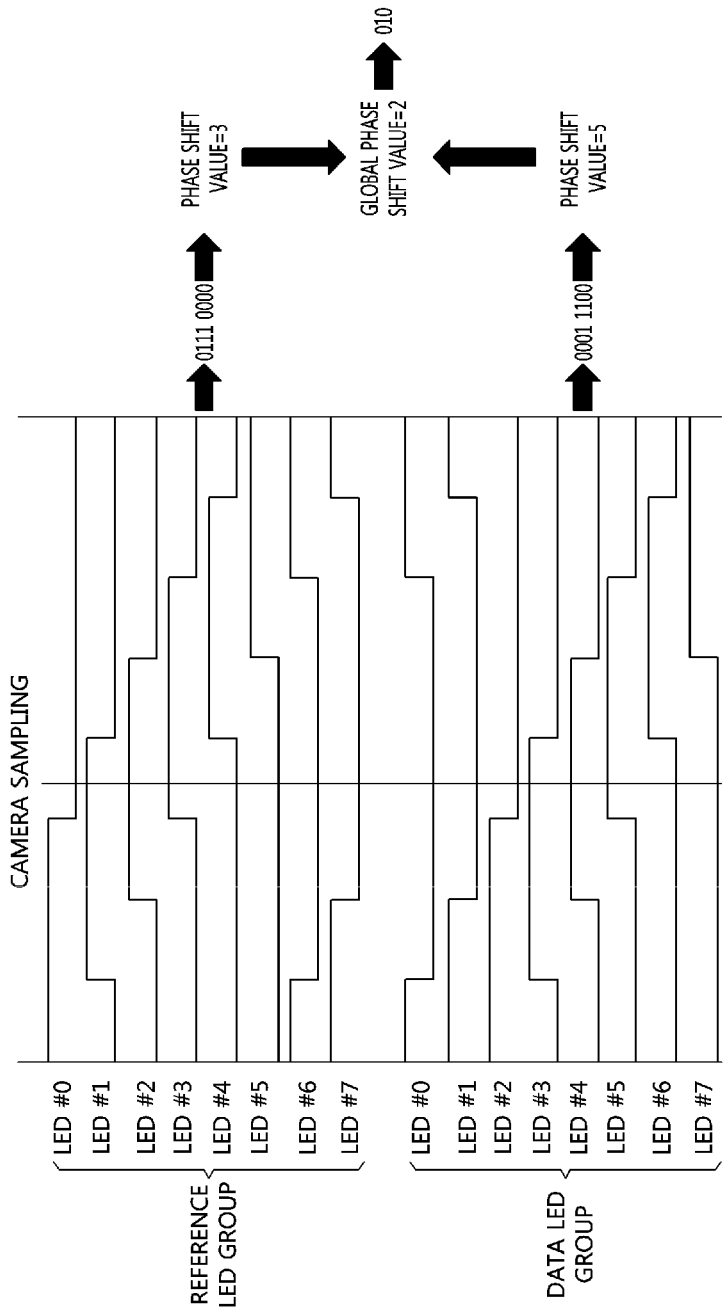
FIG. 12 is a conceptual diagram showing a first example embodiment of a decoding operation in a communication system.

FIG. 12 is a conceptual diagram showing a first example embodiment of a decoding operation in a communication system.

Referring to FIG. 12, a second communication node may detect blink states of a reference LED group and a data LED group included in a second LED array of a first communication node. An LED operating in ON state may be indicated by 1, and an LED operating in OFF state may be indicated by 0. The second communication node may output "0111 0000" on the basis of blink states of LED #0 to LED #7 belonging to the reference LED group and output "0001 1100" on the basis of blink states of LED #0 to LED #7 belonging to the data LED group.

Subsequently, the second communication node may determine local phase shift values corresponding to output bit streams (i.e., "0111 000" and "0001 1100"), which have been determined on the basis of the blink states of LED #0 to LED #7, on the basis of Table 6 to Table 12. In other words, the second communication node may determine a local phase shift value of the output bit stream acquired from the reference LED group to be 3 and determine a local phase shift value of the output bit stream acquired from the data LED group to be 5.

Subsequently, the second communication node may determine a difference between the local phase shift values. The difference between the local phase shift values may be a global phase shift value. Here, the difference between the local phase shift value corresponding to the blink states of the reference LED group and the local phase shift value corresponding to the blink states of the data LED group (i.e., the global phase shift value) may be 2. The second communication node may output "010" which is a bit stream mapped to the global phase shift value of 2 in Table 5 (i.e., a final bit stream). The second communication node may acquire the final bit stream (i.e., user data) by performing the above-described decoding operations.

Figure 13:
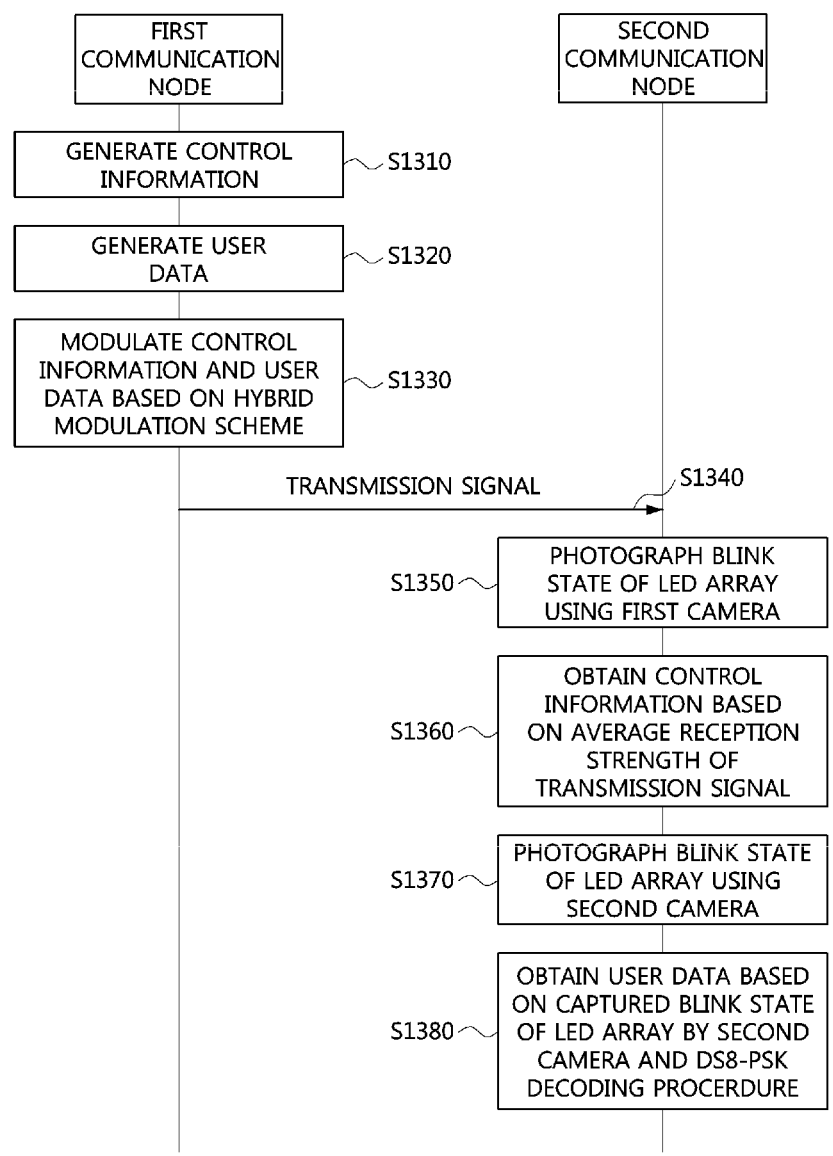
FIG. 13 is a sequence diagram illustrating a second example embodiment of a method of transmitting and receiving data in a communication system.

FIG. 13 is a sequence diagram illustrating a second example embodiment of a method of transmitting and receiving data in a communication system.

Referring to FIG. 13, a communication system may include a first communication node and a second communication node. The first communication node may be the first communication node 110 shown in FIG. 1, and the second communication node may be the second communication node 120 shown in FIG. 2. Each of the first communication node and the second communication node may be configured equal or similar to the communication node 200 shown in FIG. 2. A transmission module included in each of the first communication node and the second communication node may be configured equal or similar to the example embodiments shown in FIGS. 3, 4, and 7. A reception module included in each of the first communication node and the second communication node may be configured equal or similar to the example embodiments shown in FIGS. 9 and 10.

The first communication node may generate control information (S1310). The control information may include one or more information elements among the information elements described in Table 4. The control information may be processed by the first transmission processing section 310 shown in FIG. 3. The first communication node may generate user data (S1320). The user data may be processed by the second transmission processing section 320 shown in FIG. 3. The first communication node may modulate the control information and the user data using the hybrid modulation scheme (S1330). The first communication node may generate a first signal by modulating the control information using a first modulation scheme (e.g., C-OOK). The first communication node may generate a second signal by modulating the user data using a second modulation scheme (e.g., DS8-PSK). The transmission rate of the first modulation scheme may be lower than the transmission rate of the second modulation scheme.

Figure 14:
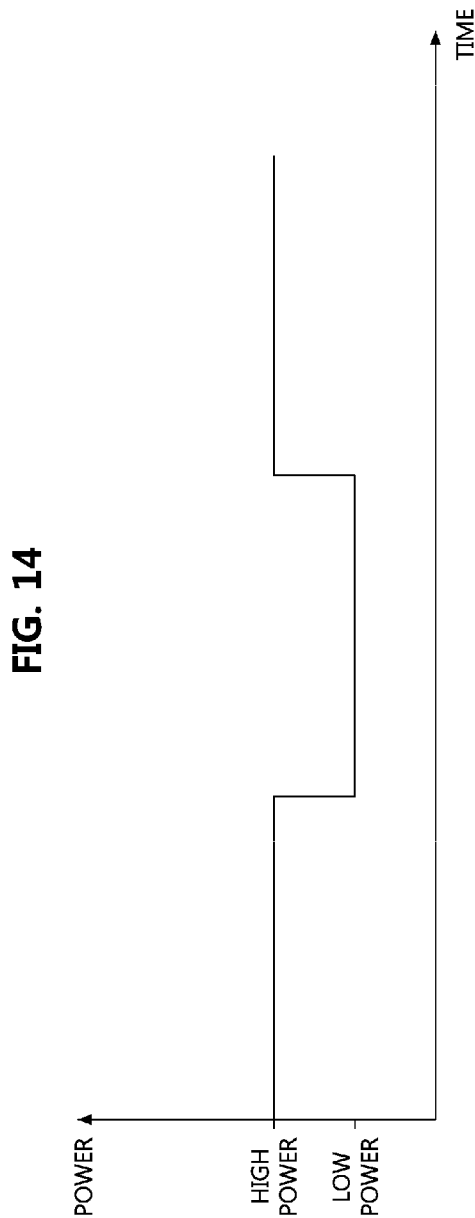
FIG. 14 is a timing diagram illustrating a first signal generated by a first modulation scheme in a communication system.

FIG. 14 is a timing diagram illustrating a first signal generated by a first modulation scheme in a communication system, and FIG. 15 is a timing diagram illustrating a second signal generated by a second modulation scheme in a communication system.

Referring to FIGS. 14 and 15, a value of the first signal may be determined according to light intensity in specific duration. When the light intensity of the first signal is above a threshold exists in the specific duration, the first signal may indicate "1" in the specific duration. When the light intensity of the first signal is below the threshold in the specific duration, the first signal may indicate "0" in the specific duration. For example, a signal with high power may indicate "1" and a signal with low power may indicate "0." The value of the second signal may be determined according to light intensity in specific duration. When the light intensity of the second signal is above a threshold in the specific duration, the second signal may indicate "1" in the specific duration. When the light intensity of the second signal is below the threshold in the specific duration, the second signal may indicate "0" in the specific duration. The light intensity of the second signal may reflect only the number of LEDs which operate in ON in the specific duration. Referring again to FIG. 13, the first communication node may generate a transmission signal based on the first signal and the second signal. The first communication node may transmit the transmission signal (S1340). The transmission signal may be transmitted through the LED array included in the first communication node. The transmission signal transmitted from the first communication node may be as follows.

Figure 16:
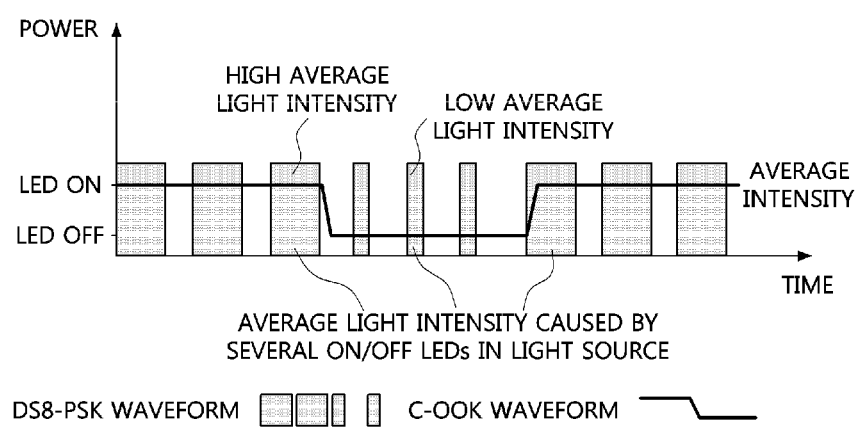
FIG. 16 is a timing diagram illustrating a transmission signal transmitted from a first communication node in a communication system.

FIG. 16 is a timing diagram illustrating a transmission signal transmitted from a first communication node in a communication system.

Referring to FIG. 16, the first communication node may generate the transmission signal by adjusting the transmission dimming levels of the second signal according to the transmission power of the first signal. That is, the transmission power (e.g., dimming level) of the second signal may be adjusted according to the value of the first signal. In duration where the value of the first signal is "1," the transmission dimming level of the second signal may be set to high. In duration where the value of the first signal is "0," the transmission dimming level of the second signal may be set to a lower level than the previous existing dimming level setting. The value of the first signal may be determined based on the average strength (e.g., average intensity) of the second signal in the specific duration. When the average strength of the second signal is greater than or equal to a threshold in the specific duration, the value of the first signal may be interpreted as "1" in the specific duration. When the average strength of the second signal is less than the threshold in the specific duration, the value of the first signal may be interpreted as "0" in the specific duration.

Referring again to FIG. 13, the second communication node may receive the transmission signal from the first communication node. In this case, the first camera of the second communication node (e.g., the first camera 910 shown in FIG. 9) may capture the blink state of the LED array included in the first communication node according to a predefined period. (S1350). The predefined period may correspond to the bit rate of the first signal. The first communication node may identify the value (e.g., control information) of the first signal by demodulating the transmission signal based on the average reception strength of the transmission signal (S1360). For example, when the average reception strength of the transmission signal is greater than or equal to the threshold in the specific duration, the second communication node may determine that the value of the transmission signal is "1" in the specific duration. When the average reception strength of the transmission signal is less than the threshold in the specific duration, the second communication node may determine that the value of the transmission signal is "0" in the specific duration.

When step S1360 is completed, the second communication node may detect the ROI using the first camera. The second camera (e.g., the second camera 920 shown in FIG. 9) of the second communication node may photograph a blink state of the LED array included in the first communication node in the ROI according to the predefined period. (S1370). Steps S1350 and S1370 may be performed at the same time. The predefined period in step S1370 may be shorter than the predefined period in step S1350. The first communication node may identify the value (e.g., user data) of the second signal based on the light intensity (e.g., comparison result of the light intensity and the threshold) of the transmission signal at a specific time (S1380).

According to example embodiments of the present invention, in a communication system, a first communication node can transmit a signal to a second communication node using a first modulation scheme (e.g., C-OOK) or a second modulation scheme (e.g., DS8-PSK). A signal transmission rate of the first modulation scheme may be lower than that of the second modulation scheme. The first communication node can transmit important information (e.g., an ID and transmission parameters required for transmission according to the second modulation scheme) using the first modulation scheme and transmit user data using the second modulation scheme.

Meanwhile, the second communication node may expect that important information will be transmitted on the basis of the first modulation scheme and may expect that user data will be transmitted on the basis of the second modulation scheme. Therefore, the second communication node can acquire the important information on the basis of the first modulation scheme and receive the user data on the basis of the important information. The user data can be received according to the second modulation scheme. Therefore, it is possible to satisfy transmission requirements according to types of signals, and accordingly, performance of the communication system can be improved.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may fall within the spirit and scope of the present disclosure.

What is claimed is:

1. A first communication node in a communication system, the first communication node comprising:
a processor;
a first light-emitting diode (LED) array configured to transmit a first signal by blinking a first LED set of the first LED array based on first control of the processor;
a second LED array configured to transmit a second signal by blinking a second LED set of the second LED array based on second control of the processor; and
a memory storing one or more instructions configured to be executed by the processor,
wherein the one or more instructions, when executed by the processor, cause the processor to:
modulate control information using camera on-off keying (C-OOK);
transmit the first signal including the modulated control information to a second communication node by blinking the first LED;
modulate user data using dimmable spatial 8-phase shift keying (DS8-PSK); and
transmit the second signal including the modulated user data to the second communication node by blinking the second LED set,
wherein each of the first LED set and the second LED set includes one or more LEDs,
wherein the control information includes information indicating that a hybrid modulation scheme using the C-OOK and DS8-PSK is supported, and
wherein the one or more instructions, when executed by the processor, further case the processor to transmit the second signal to the second communication mode when receiving a response to the first signal from the second communication node, the response including information indicating that the second communication node supports the hybrid modulation scheme using the C-OOK and DS8-PSK.

2. The first communication node of claim 1, wherein the control information further includes an identifier (ID) of the first communication node, and an ID of the second communication node.

3. The first communication node of claim 1, wherein the control information further includes information indicating a number of LED groups included in the second LED array, information indicating a number of LEDs included in each of the LED groups, and information indicating an LED arrangement in each of the LED groups.

4. The first communication node of claim 1, wherein the control information further includes information on a first table indicating mapping relationships between global phase shift values and bit streams, information on a second table indicating mapping relationships between bit streams and local phase shift values according to dimming levels, and information on a pattern of dimming levels.

5. The first communication node of claim 4, wherein the pattern of dimming levels is applied in units of packets or sub-packets, the packets include a plurality of sub-packets, and a plurality of sub-packets included in the same packet include identical user data.

6. The first communication node of claim 1, wherein the second signal includes a reference signal transmitted through a reference LED group included in the second LED array and a data signal transmitted through a data LED group included in the second LED array,
wherein the reference signal has a first local phase shift value,
wherein the data signal has a second local phase shift value, and
wherein a difference between the first local phase shift value and the second local phase shift value is a global phase shift value.

7. A first communication node in a communication system, the first communication node comprising:
a processor;
a first camera configured to photograph a first blink state of a first light-emitting diode (LED) array included in a second communication node based on first control of the processor;
a second camera configured to photograph a second blink state of a second LED array included in the second communication node based on second control of the processor; and
a memory storing one or more instructions configured to be executed by the processor,
wherein the one or more instructions, when executed by the processor, cause the processor to:
acquire control information from the first blink state using camera on-off keying (C-OOK); and
acquire user data from the second blink state using dimmable spatial 8-phase shift keying (DS8-PSK),
wherein the control information includes information indicating that a hybrid modulation scheme using the C-OOK and DS8-PSK is supported, and
wherein the one or more instructions, when executed by the processor, further cause the processor to:
transmit, to a second communication node, a response to the control information, the response comprising information indicating that the first communication node supports the hybrid modulation scheme using the C-OOK and DS8-PSK; and
acquire the user data that the second communication node sends using the DS8-PSK after the response is received from the first communication node.

8. The first communication node of claim 7, wherein the control information further includes an identifier (ID) of the first communication node, an ID of the second communication node, information indicating a number of LED groups included in the second LED array, information indicating a number of LEDs included in each of the LED groups, and information indicating an LED arrangement in each of the LED groups.

9. The first communication node of claim 7, wherein the control information further includes information on a first table indicating mapping relationships between global phase shift values and bit streams, information on a second table indicating mapping relationships between bit streams and local phase shift values according to dimming levels, and information on a pattern of dimming levels.

10. The first communication node of claim 8, wherein the pattern of dimming levels is applied in units of packets or sub-packets,
wherein the packets include a plurality of sub-packets, and wherein a plurality of sub-packets included in the same packet include identical user data.

11. The first communication node of claim 7, wherein the processor is configured to acquire the user data on the basis of a reference signal received through a reference LED group included in the second LED array and a data signal received through a data LED group included in the second LED array, wherein the reference signal has a first local phase shift value, wherein the data signal has a second local phase shift value, and wherein a difference between the first local phase shift value and the second local phase shift value is a global phase shift value.

\* \* \* \* \*